US 8,044,867 B2

(12) United States Patent
Kikuchi et al.

(10) Patent No.: US 8,044,867 B2
(45) Date of Patent: Oct. 25, 2011

(54) COMMUNICATION TERMINAL APPARATUS (75) Inventors: Hironori Kikuchi, Miyagi (JP); Kenichi Sato, Miyagi (JP); Nobuaki Tanaka, Kanagawa (JP)

(73) Assignee: Panasonic Corporation, Osaka (JP)

( * ) Notice: Subject to any disclaimer, the term of this patent is extended or adjusted under 35 U.S.C. 154(b) by 75 days.

(21) Appl. No.: 12/162,837

(22) PCT Filed: Jan. 30, 2007

(86) PCT No.: PCT/JP2007/051513
§ 371 (c)(1),
(2), (4) Date: Oct. 28, 2009

(87) PCT Pub. No.: WO2007/091452
PCT Pub. Date: Aug. 16, 2007

(65) Prior Publication Data
US 2010/0149045 A1 Jun. 17, 2010

(30) Foreign Application Priority Data

Feb. 10, 2006 (JP) .............................. P. 2006-034059

(51) Int. Cl.
*H01Q 1/24* (2006.01)
(52) U.S. Cl. ....................................... 343/702; 343/846
(58) Field of Classification Search ........... 343/700 MS, 343/702, 846
See application file for complete search history.

(56) References Cited

U.S. PATENT DOCUMENTS

| 6,166,694 | A | * | 12/2000 | Ying | 343/702 |
| 6,819,287 | B2 | * | 11/2004 | Sullivan et al. | 343/700 MS |
| 7,136,019 | B2 | * | 11/2006 | Mikkola et al. | 343/702 |
| 7,518,561 | B2 | * | 4/2009 | Mei | 343/702 |
| 2007/0164909 | A1 | * | 7/2007 | Ogawa et al. | 343/702 |

FOREIGN PATENT DOCUMENTS

| JP | 06-334420 | 12/1994 |
| JP | 2000-261243 | 9/2000 |
| JP | 2001-077611 | 3/2001 |
| JP | 2002-185238 | 6/2002 |
| JP | 2002-223107 | 8/2002 |
| JP | 2004-088218 | 3/2004 |
| JP | 2004-166284 | 6/2004 |

OTHER PUBLICATIONS

International Search Report for PCT/JP2007/051513; Mar. 1, 2007.

* cited by examiner

*Primary Examiner* — Tan Ho
(74) *Attorney, Agent, or Firm* — Seed IP Law Group PLLC (57) ABSTRACT

A problem of the invention is to provide a small-size communication terminal apparatus capable of reducing an SAR and also widening a band of an antenna and further achieving thinning.

The communication terminal apparatus has a substrate (13) disposed inside a housing, a power feeding part (12) disposed in the substrate (13), a monopole antenna (11) having plural elements of multi-frequency sharing, the monopole antenna for feeding power by electrically connecting one end to the power feeding part, and a ground wire (14) electrically connected to a wireless ground of the substrate (13), and the monopole antenna (11) having the plural elements is arranged in a direction vertical to a surface of the substrate (13) and in a back surface direction of the housing so as to be opposed to a human body at the time of a call.

6 Claims, 12 Drawing Sheets

COMMUNICATION TERMINAL APPARATUS

TECHNICAL FIELD

The present invention relates to a communication terminal apparatus capable of achieving miniaturization and thinning together with widening of a band of an antenna, a reduction in an SAR (Specific Absorption Ratio) and an improvement in gain at the time of a call.

BACKGROUND ART

In recent years, an antenna is often built into a communication terminal apparatus such as a mobile telephone for the purpose of reduction in size and weight, thinning, etc. As a result of that, a housing approaches human body's head at the time of a call, so that there were problems that electromagnetic waves emitted from the antenna are absorbed in human body's head and antenna gain at the time of the call deteriorates and SAR characteristics deteriorate by approach of the antenna and an antenna and an antenna power feeding part to human body's head.

Figure 12:
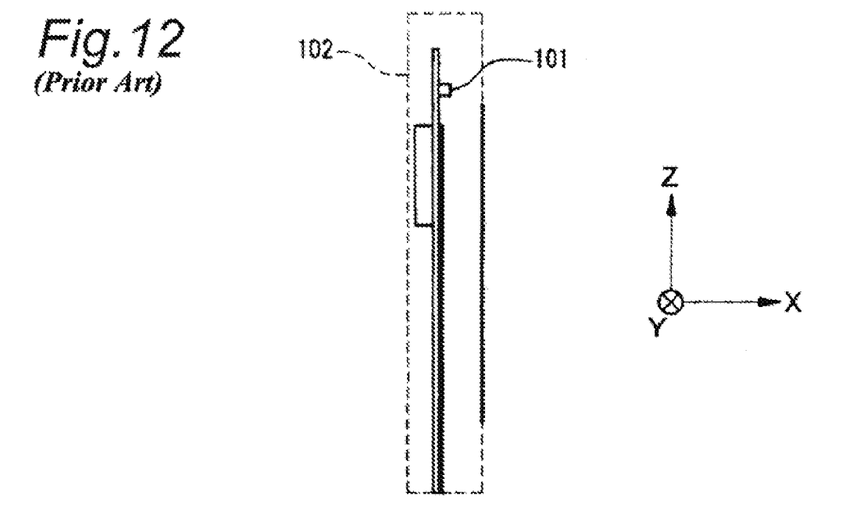
FIG. 12 is a side view of a communication terminal apparatus into which a conventional chip antenna is built.

Therefore, for example, an apparatus in which in a communication terminal apparatus 102 into which a chip antenna 101 as shown in FIG. 12 is built, directivity can be increased to the side opposite to the side of the human body who grips a housing of this communication terminal apparatus 102 and an influence of electromagnetic waves emitted by the communication terminal apparatus 102 such as a mobile telephone on the human body can be suppressed has been known (for example, see Patent Reference 1). In addition, in the same figure, numeral 103 shows a ground.

Figure 13:
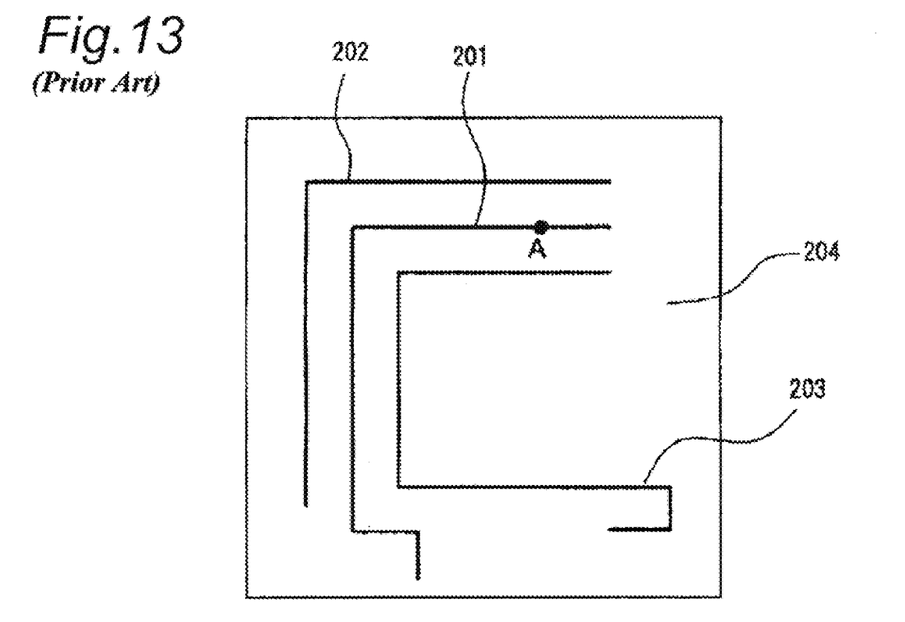
FIG. 13 is a top view of a communication terminal apparatus to which a conventional ground wire is added.

Also, an apparatus having a configuration in which a ground wire is added in order to widen a band of an antenna has been known. That is, as a communication terminal apparatus having such a configuration, for example, an apparatus capable of having wide band frequency characteristics even when each element is bent and miniaturized by bending and arranging a ground wire 202 in parallel with the outside of an inverted F antenna 201 and bending and arranging a ground wire 203 in parallel with the inside of the bent inverted F antenna 201 as shown in FIG. 13 has also been known (for example, see Patent Reference 2). In addition, in the same figure, numeral 204 shows a ground plane to which the inverted F antenna 201 is connected through a short-circuit conductor connected at a power feeding point A.

Figure 14:
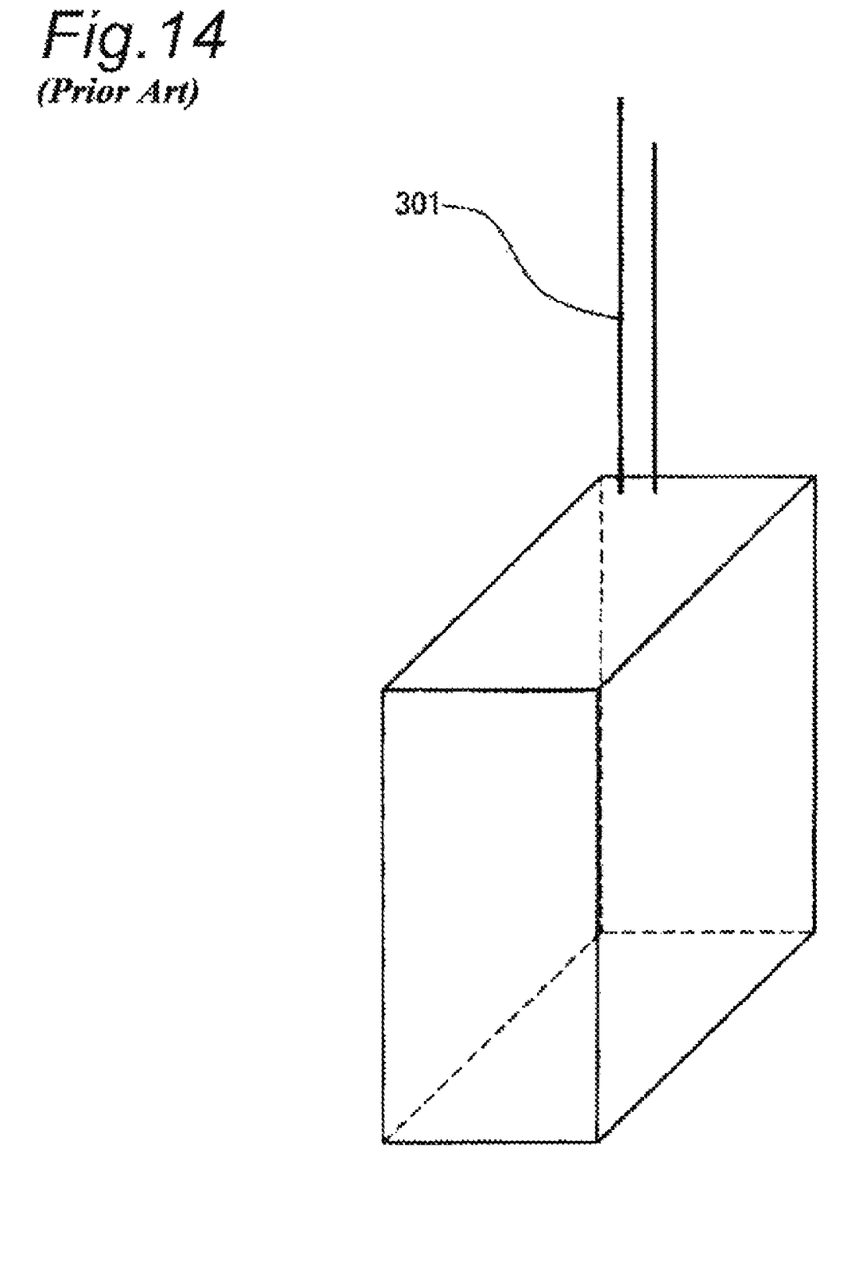
FIG. 14 is a perspective view of a communication terminal apparatus for improving radiation efficiency and reducing radio wave absorption in the human body by adding a conventional parasitic element and performing directivity control.

Further, as another type communication terminal apparatus other than the apparatus described above, for example, an apparatus capable of improving radiation efficiency and reducing radio wave absorption in the human body by adding a parasitic element 301 and performing directivity control as shown in FIG. 14 has also been known.

Patent Reference 1: JP-A-2001-77611 (Page 5, FIG. 1)
Patent Reference 2: JP-A-2000-261243 (Page 7, FIG. 1(a))
Patent Reference 3: JP-A-2002-223107 (Page 6, FIG. 1)

DISCLOSURE OF THE INVENTION

Problems that the Invention is to Solve

However, the apparatus described in Patent Reference 1 had problems that a band of an antenna becomes narrow by incorporating a chip antenna and a wave director must be added in order to control directivity of an antenna Also, the apparatus for taking measures to add the ground wire in order to widen a band of the antenna as described in Patent Reference 2 had problems that depending on a shape of the ground wire, an antenna current concentrates and further an SAR deteriorates.

Also, the apparatus having the configuration as described in Patent Reference 3 had problems that space of the inside of a housing cannot be used effectively and cost increases when the parasitic element is added in order to control directivity of an antenna.

The invention has been implemented in view of the circumstances described above, and an object of the invention is to provide a small-size communication terminal apparatus capable of reducing an SAR and also widening a band of an antenna and further achieving thinning.

Means for Solving the Problems

A communication terminal apparatus of the invention has a substrate disposed inside a housing, a power feeding part disposed in the substrate, a monopole antenna having plural elements of multi-frequency sharing, the monopole antenna for feeding power by electrically connecting one end to the power feeding part, and a ground wire electrically connected to a wireless ground of the substrate, and has a configuration in which the monopole antenna is arranged in a direction vertical to the substrate surface and in a back surface direction of the housing so as to extend to the opposite side separate from a human body. By this configuration, electromagnetic waves absorbed in human body' head decrease, so that antenna gain at the time of a call can be improved and the peak point of a current moves away from the human body, so that an SAR at the time of the call can be reduced. Also, by adding the ground wire, a band of the antenna can be widened and SAR characteristics can further be reduced.

Also, a communication terminal apparatus of the invention has a substrate disposed inside a housing, a power feeding part disposed in the substrate, a monopole antenna having plural elements of multi-frequency sharing, the monopole antenna for feeding power by electrically connecting one end to the power feeding part, and a ground wire electrically connected to a wireless ground of the substrate, and has a configuration in which the open end of the monopole antenna is formed in a position of a housing back surface direction far from a human body and an antenna element resonating at a particular first frequency of the monopole antenna having the plural elements is formed in the human body side and an antenna element resonating at a second frequency and a third frequency or higher different from the first frequency is arranged in a position farther from the human body than the antenna element resonating at the first frequency. By this configuration, electromagnetic waves absorbed in human body' head decrease, so that antenna gain at the time of a call can be improved and the peak point of a current moves away from the human body, so that an SAR at the time of the call can be reduced. Also, by adding the ground wire, a band of the antenna can be widened and SAR characteristics can further be reduced. Further, the antenna element resonating at the second frequency and the third frequency or higher is arranged in the position farther from the human body than the antenna element resonating at the first frequency, so that the peak point of a current moves away from the human body and the SAR at the time of the call can be reduced.

Also, a communication terminal apparatus of the invention has a substrate disposed inside a housing, a power feeding part disposed in the substrate, a monopole antenna having plural elements of multi-frequency sharing, the monopole antenna for feeding power by electrically connecting one end to the power feeding part, and a ground wire electrically connected to a wireless ground of the substrate, and has a configuration in which the monopole antenna is made of a plate-shaped or line-shaped element and is formed by a sheet metal, a flexible substrate or a printed substrate. By this configuration, by having the ground wire, a band of the antenna can be widened and SAR characteristics can also be reduced. Further, the monopole antenna is made of a plate-shaped or line-shaped element and is formed by a sheet metal, a flexible substrate or a printed substrate, so that various shapes can be constructed and incorporated easily.

Also, a communication terminal apparatus of the invention has a substrate disposed inside a housing, a power feeding part disposed in the substrate, a monopole antenna having plural elements of multi-frequency sharing, the monopole antenna for feeding power by electrically connecting one end to the power feeding part, and a ground wire electrically connected to a wireless ground of the substrate, and has a configuration in which the ground wire has a plate shape and a circumferential length of the ground wire is about (½)λ of a working frequency and a length of a direction along a width direction of the substrate of the ground wire is about (⅛)λ or less. By this configuration, by the ground wire with the circumferential length of about (½)λ, a band of the antenna can be widened and SAR characteristics can also be reduced.

Effect of the Invention

According to the invention, there can be provided a communication terminal apparatus having effects capable of improving antenna gain at the time of a call and reducing an SAR having an influence on the human body by electromagnetic waves and widening a band of an antenna, and having small-size and thin characteristics. Also, according to the invention, there can be provided a communication terminal apparatus having effects in which by adding a ground wire in the vicinity of a power feeding point of the inside of a housing, a band of an antenna can be widened and the peak of a current concentrating in the vicinity of the power feeding point can be distributed and also by forming the ground wire in a plate shape, the peak of the current can further be distributed and the SAR can be reduced.

DESCRIPTION OF REFERENCE NUMERALS AND SIGNS

1 COMMUNICATION TERMINAL APPARATUS
10 HOUSING
10A UPPER SURFACE
10B BACK SURFACE
11 MONOPOLE ANTENNA (ONE-ELEMENT MONOPOLE ANTENNA)
111 SHEET METAL
111A PLATE-SHAPED SHEET METAL
111B LINE-SHAPED SHEET METAL
112 FLEXIBLE SUBSTRATE
113 PRINTED SUBSTRATE
12 POWER FEEDING PART
13 SUBSTRATE
14 GROUND WIRE
α PRINCIPAL POLARIZATION COMPONENT
β CROSS POLARIZATION COMPONENT

BEST MODE FOR CARRYING OUT THE INVENTION

A communication terminal apparatus according to an embodiment of the invention will hereinafter be described using the accompanying drawings.

Figure 1:
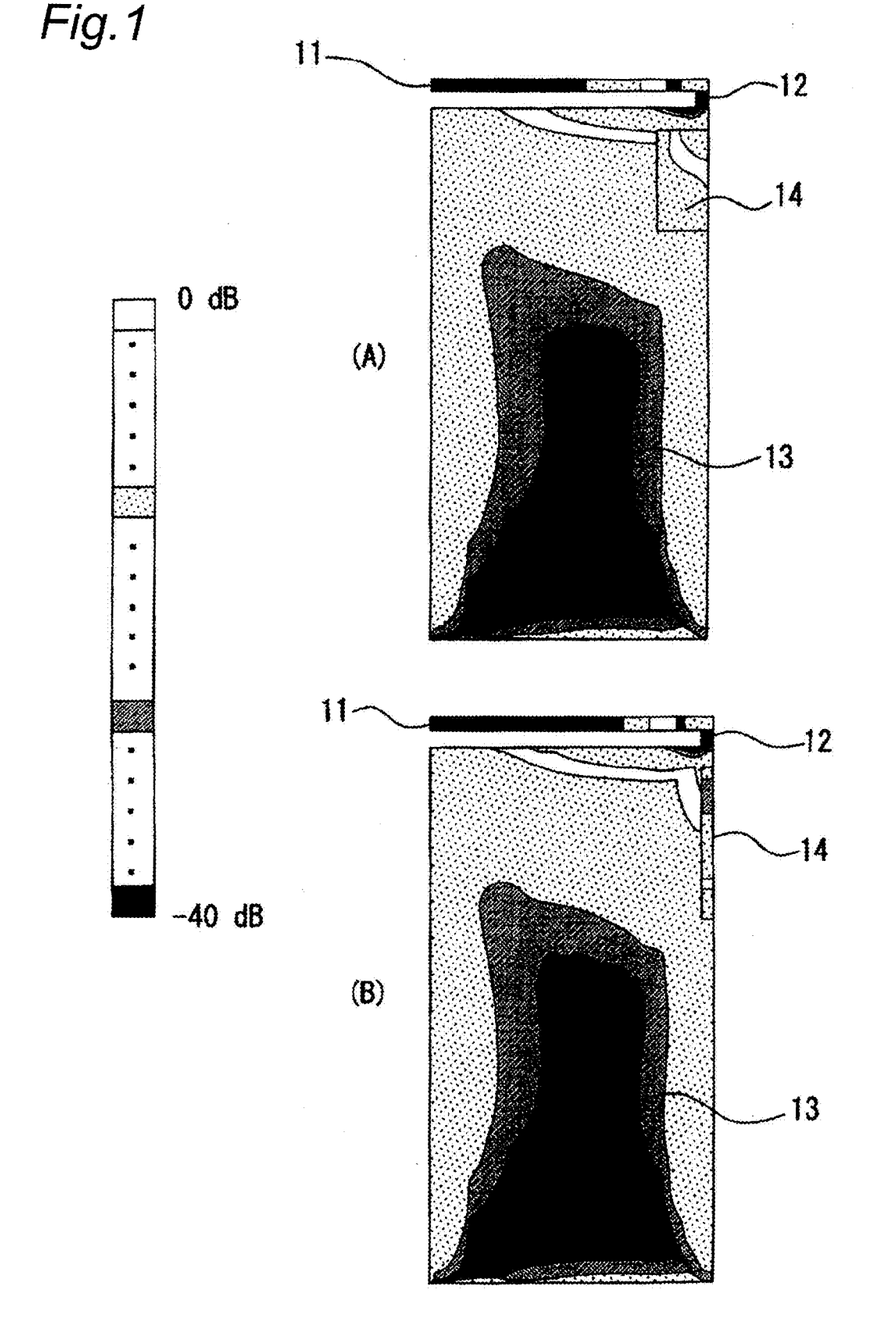
FIG. 1 is a perspective view of a communication terminal apparatus according to an embodiment of the invention.
Figure 2:
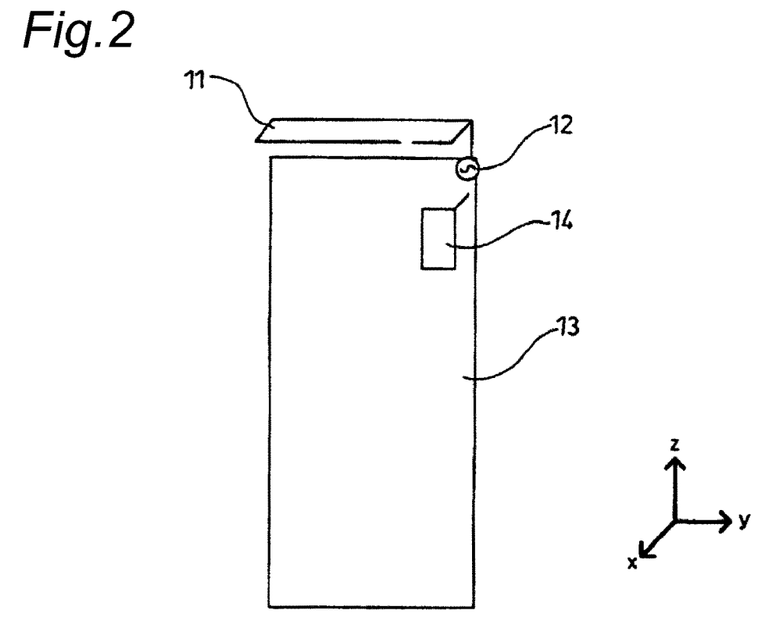
FIG. 2 is an explanatory diagram showing a configuration of an antenna portion of the inside of the communication terminal apparatus.

FIGS. 1 and 2 show a communication terminal apparatus 1 according to the embodiment of the invention, and this communication terminal apparatus 1 comprises a monopole antenna 11 having plural elements, a substrate 13 having a power feeding part 12, a ground wire 14 to which power is fed by electrically connecting one end of the ground wire 14 to the power feeding part 12, etc. inside a housing 10 of this communication terminal apparatus 1.

Figure 3:
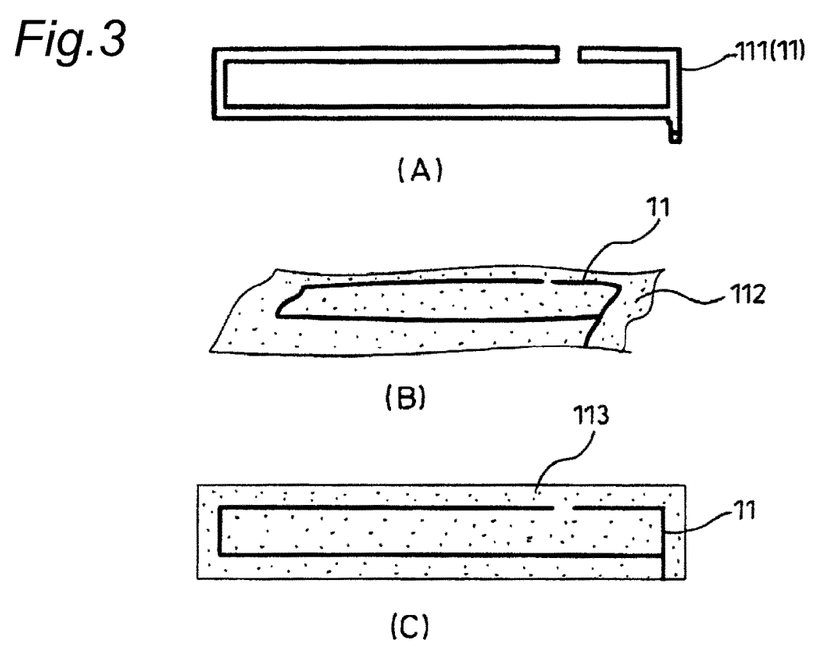
FIGS. 3A to 3C are explanatory diagrams showing configurations of antenna elements of the communication terminal apparatus.
Figure 4:
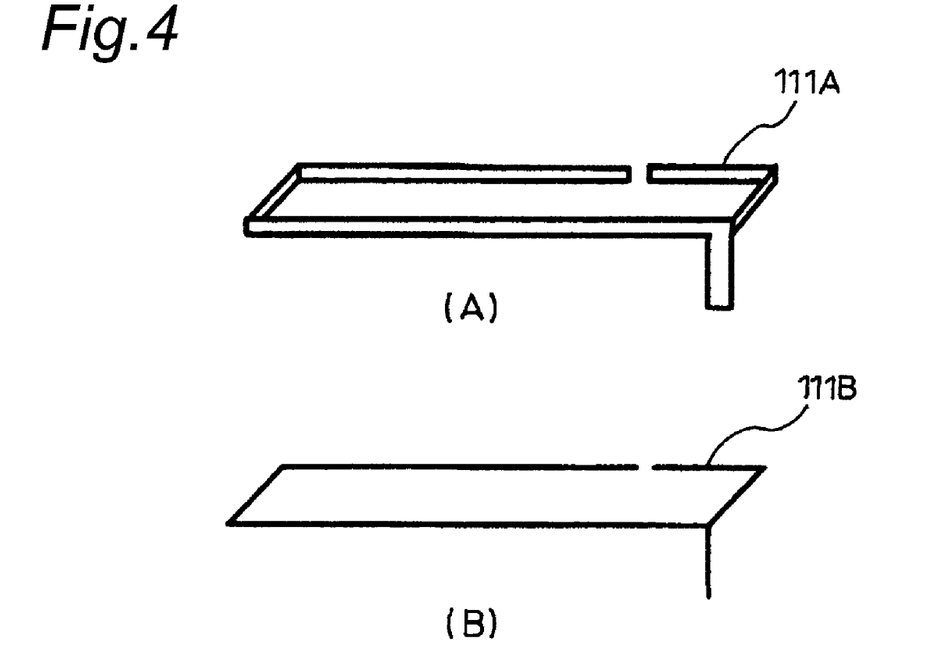
FIGS. 4A and 4B are explanatory diagrams showing concrete shapes of antenna elements of the communication terminal apparatus.

A two-element monopole antenna is used in the monopole antenna 11 of the present embodiment and, for example, as an antenna element, it is configured to be singly formed of a sheet metal 111 (FIG. 3A) or be formed in a part of a flexible substrate 112 (FIG. 3B) or be formed in a part of a printed substrate 113 (FIG. 3C). Also, when this antenna element is formed of the sheet metal, it is configured to be constructed of a plate-shaped sheet metal 111A (FIG. 4A) or a line-shaped sheet metal 111B (FIG. 4B) as shown in FIGS. 4A and 4B. In addition, it is configured to feed power from one power feeding part 12 to one end of this antenna element as shown in FIG. 2.

Next, an effect obtained by a configuration or arrangement of the antenna element will be described.

(i) First, the case of a one-element monopole antenna will be described.

Figure 5:
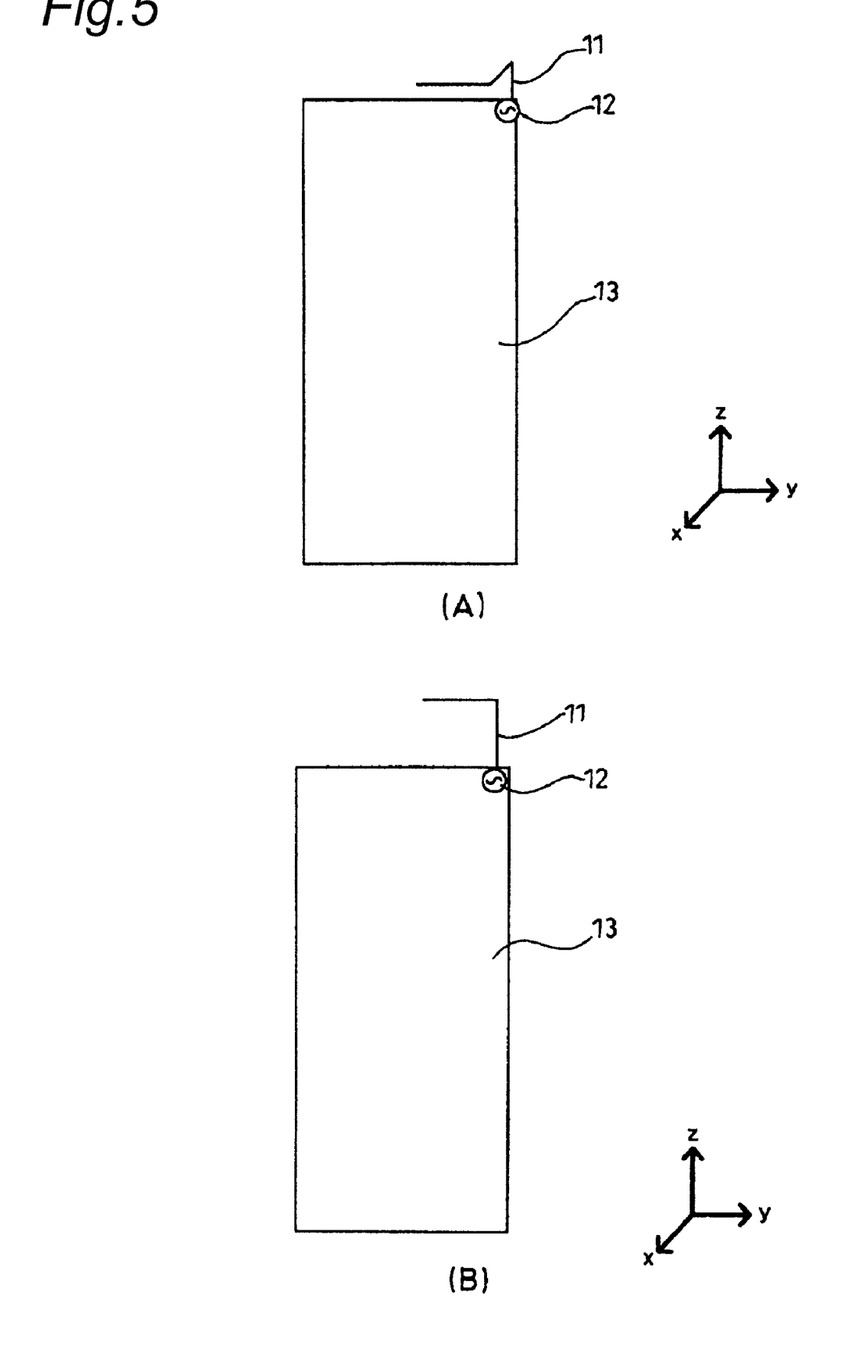
FIG. 5A is an arrangement diagram of the case where an antenna of the communication terminal apparatus is a one-element monopole antenna.
FIG. 5B is an arrangement diagram of a one-element monopole antenna shown as a comparative example.

A one-element monopole antenna 11 of FIG. 5A is arranged in a state of protruding from a back surface 10B (see FIG. 1) in a vertical direction (+X direction) from an upper surface 10A (see FIG. 1) of the housing 10 toward a direction (+X direction) of the back surface 10B of the housing 10 opposite to the human body (user) who grips the housing 10 of this communication terminal apparatus 1 by hand, and is electrically connected to the power feeding part 12 of the substrate 13.

On the other hand, a one-element monopole antenna 11 of FIG. 5B shown as a comparative example is arranged so as to straight extend in a just above direction (+Z direction) from an upper surface 10A of a housing 10 in the upper surface 10A of the housing 10, and is electrically connected to a power feeding part 12 of a substrate 13.

Figure 6:
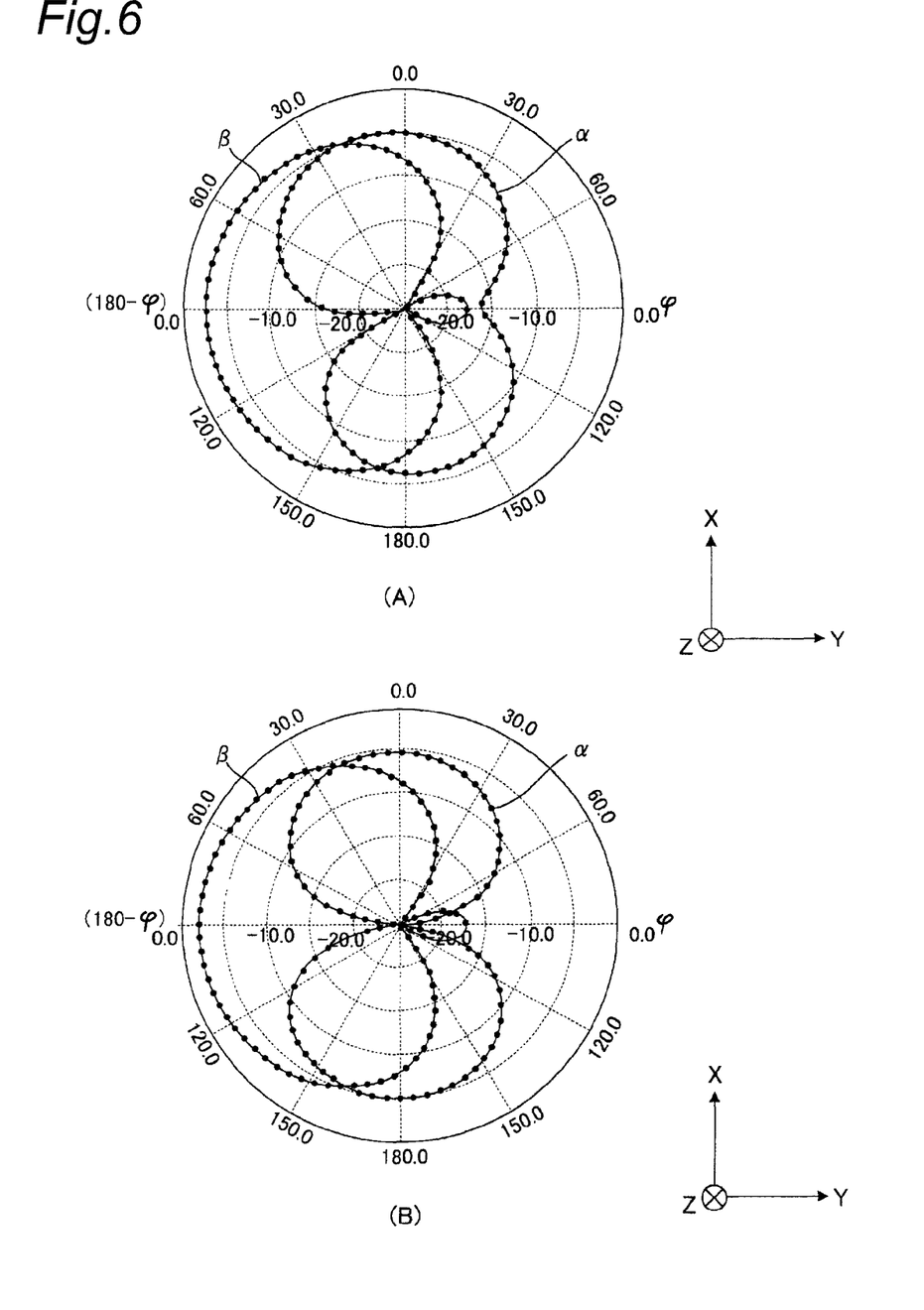
FIG. 6A is a radiation pattern diagram (X-Y plane) of the one-element monopole antenna shown in FIG. 5A.
FIG. 6B is a radiation pattern diagram of the one-element monopole antenna of the comparative example shown in FIG. 5B.

In both cases of FIGS. 5A and 5B for this (i) one-element monopole antenna, the one-element monopole antennas 11 are formed so as to be stored inside the housing 10, and respective radiation patterns are shown in FIGS. 6A and 6B.

That is, FIG. 6A is a radiation pattern diagram of 1800 MHz at the time of forming the one-element monopole antenna 11 as shown in FIG. 5A in the back surface direction (+X direction) of the housing 10, and shows a principal polarization component α and a cross polarization component β of an X-Y plane. On the other hand, FIG. 6B is a radiation pattern diagram of 1800 MHz at the time of forming the one-element monopole antenna 11 as shown in FIG. 5B in the just above direction (+Z direction) of the housing 10, and shows a principal polarization component α and a cross polarization component β of an X-Y plane.

In the case of comparing the principal polarization components of FIGS. 6A and 6B, while the principal polarization component of FIG. 6A is about −0.5 dB, an F/B ratio (Front to back ratio) of the principal polarization component of FIG. 6B is about 0 dB and there is almost no change in a radiation pattern by arrangement of the antenna element.

(ii) Subsequently, the case of a two-element monopole antenna will be described.

Figure 7:
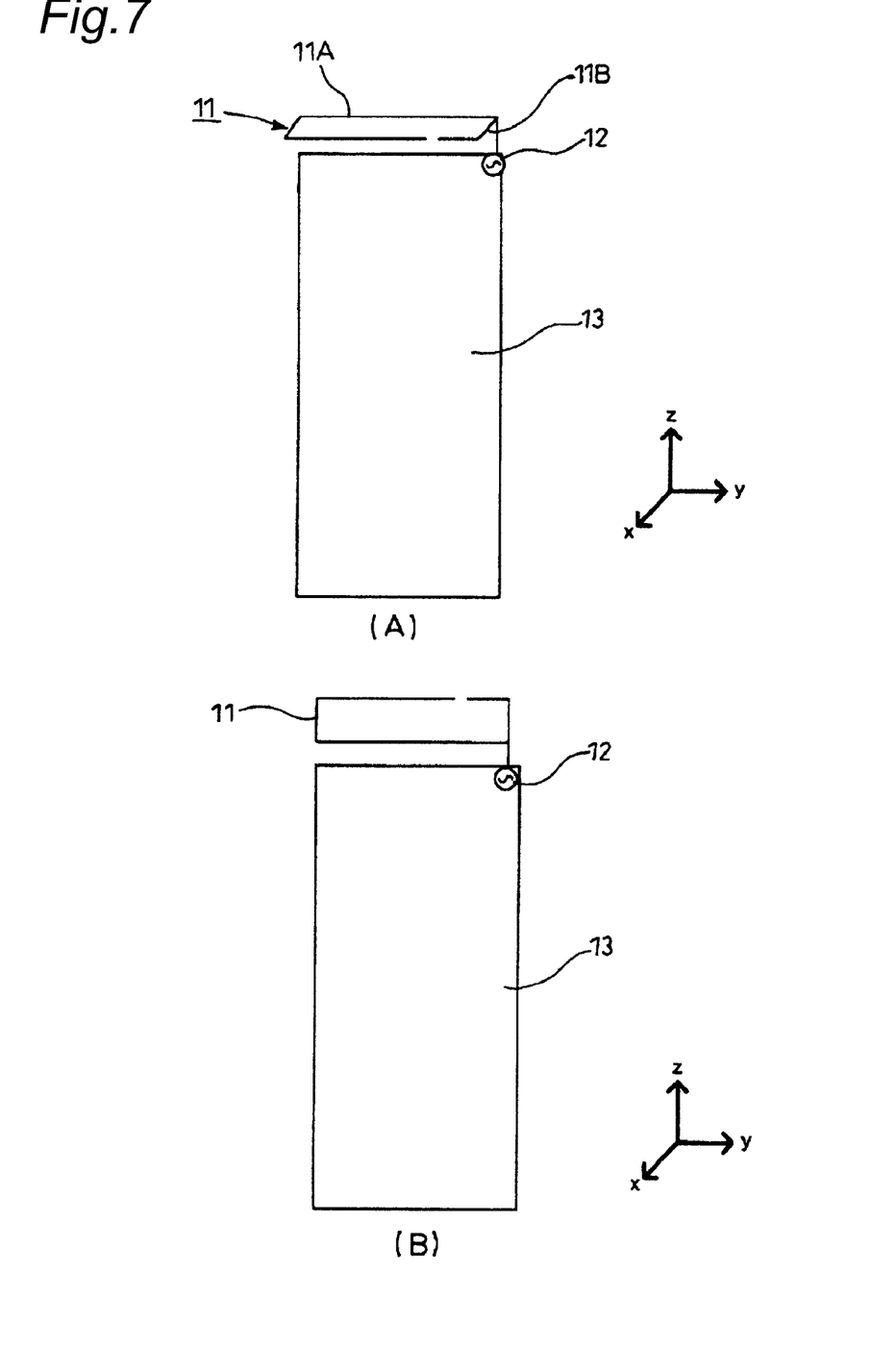
FIG. 7A is an arrangement diagram of the case where an antenna of the communication terminal apparatus of the invention is a two-element monopole antenna.
FIG. 7B is an arrangement diagram of a two-element monopole antenna shown as a comparative example.

A two-element monopole antenna of FIG. 7A is arranged in a state of protruding from an upper surface 10A of a housing 10 toward a vertical direction, that is, toward an opposite direction (+X direction) of a back surface 10B separate from a front direction (−X direction) opposed to the human body (user) who grips the housing 10 of this communication terminal apparatus 1 by hand, and is electrically connected to a power feeding part 12 of a substrate 13. On the other hand, a two-element monopole antenna 11 of FIG. 7B shown as a comparative example is arranged so as to extend in a just above direction from an upper surface 10A of a housing 10 in the upper surface 10A (see FIG. 1) of the housing 10, and is electrically connected to a power feeding part 12 of a substrate 13.

In both cases of FIGS. 7A and 7B at this time, the two-element monopole antennas 11 are formed so as to be stored inside the housing 10. Also, an antenna element 11A resonating at a band of 900 MHz among the two elements is formed in a position nearer to the human body (user) than an antenna element 11B resonating at 1800 MHz. That is, the portion which is not stored in a width direction (±Y direction) of the housing 10 is folded back in the direction (+X direction) of the back surface 10B of the housing 10, and the antenna element 11B resonating at a band of 1800 MHz is formed in the back surface direction (+X direction) of the housing 10 so as to become far from the human body (user), and the portion which is not stored in the back surface direction (+X direction) of the housing 10 is folded back in the width direction (±Y direction) of the housing and is formed. Also, the open end of the two-element monopole antenna described above is formed in the back surface direction of the housing 10 so as to become far from the human body (user).

Figure 8:
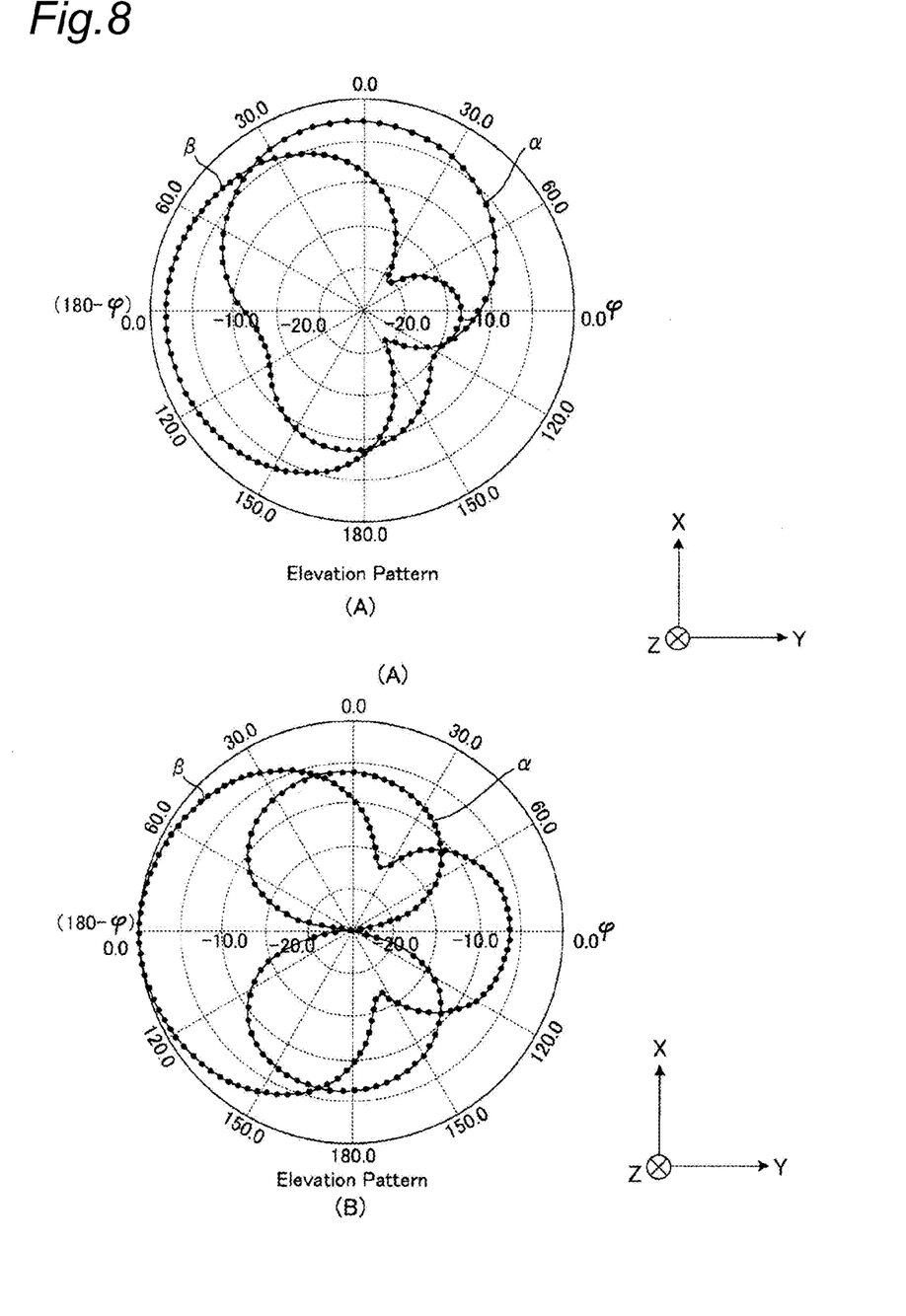
FIG. 8A is a radiation pattern diagram (X-Y plane) of the two-element monopole antenna shown in FIG. 5A.
FIG. 8B is a radiation pattern diagram of the two-element monopole antenna of the comparative example shown in FIG. 5B.
Figure 9:
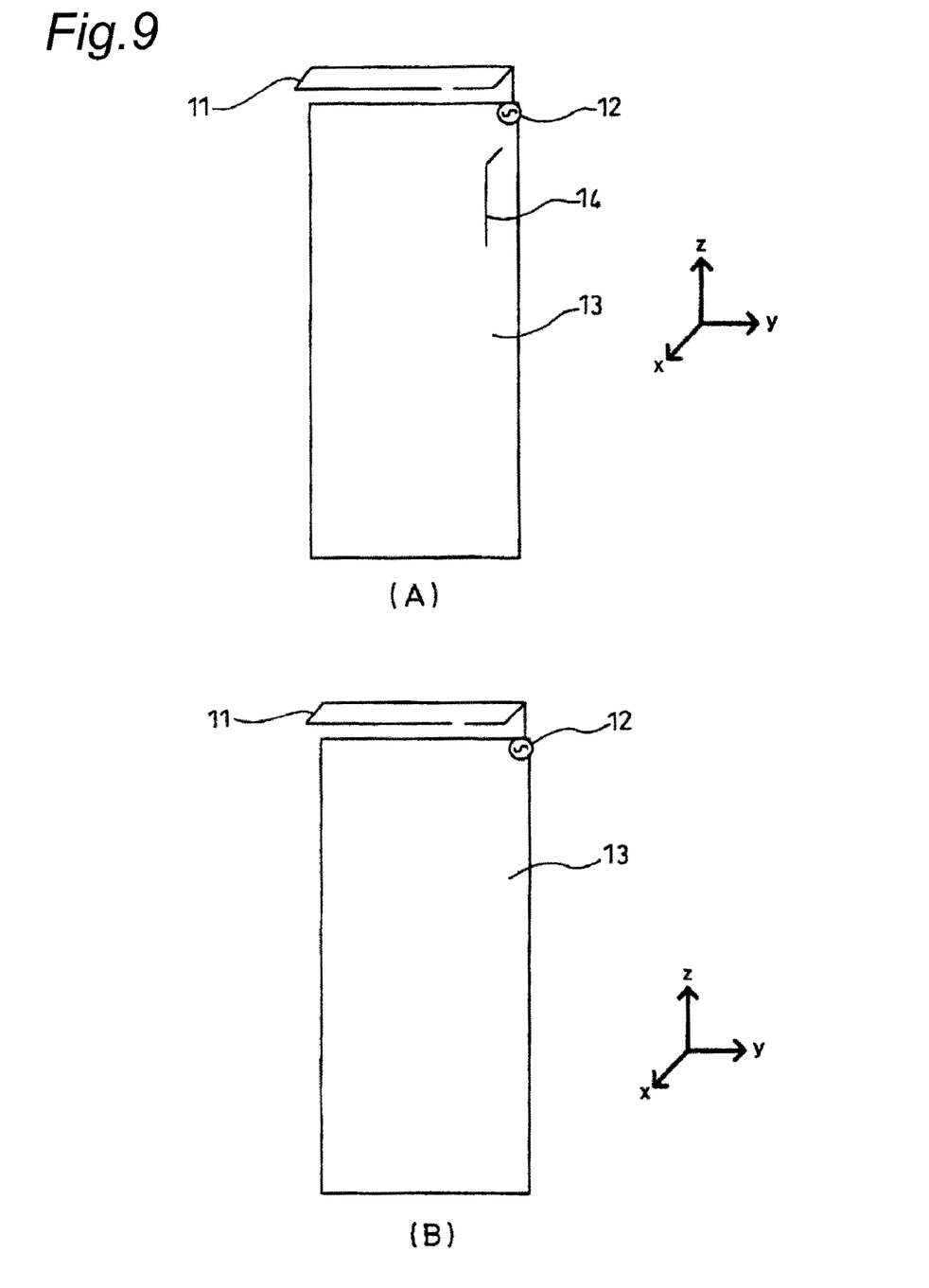
FIG. 9A is a configuration diagram showing a ground wire etc. of the communication terminal apparatus according to the embodiment of the invention.
FIG. 9B is a configuration diagram showing a comparative example without having a ground wire in the communication terminal apparatus.
Figure 10:
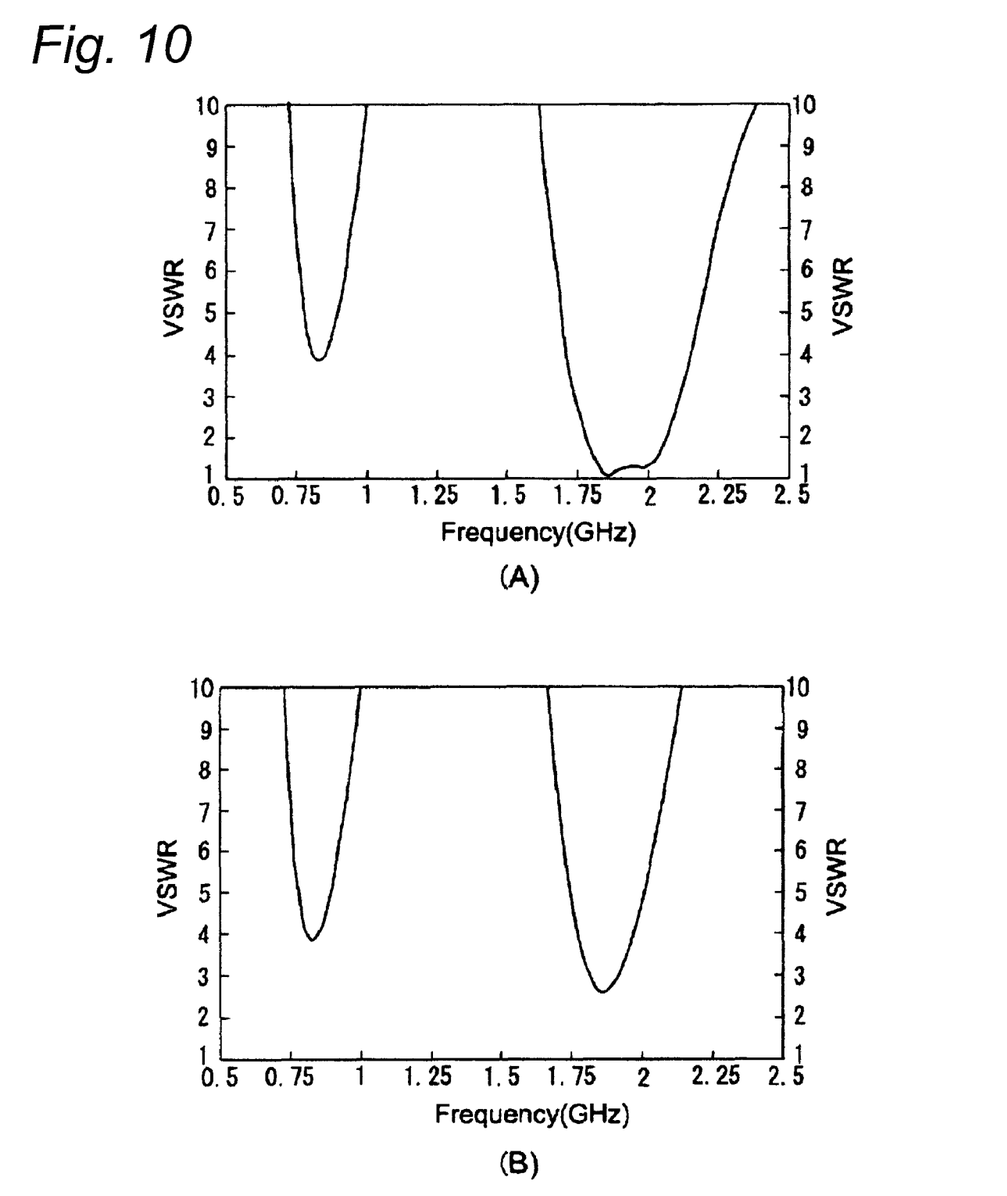
FIG. 10A is a VSWR diagram of the communication terminal apparatus shown in FIG. 9A.
FIG. 10B is a VSWR diagram of the comparative example shown in FIG. 9B.
Figure 11:
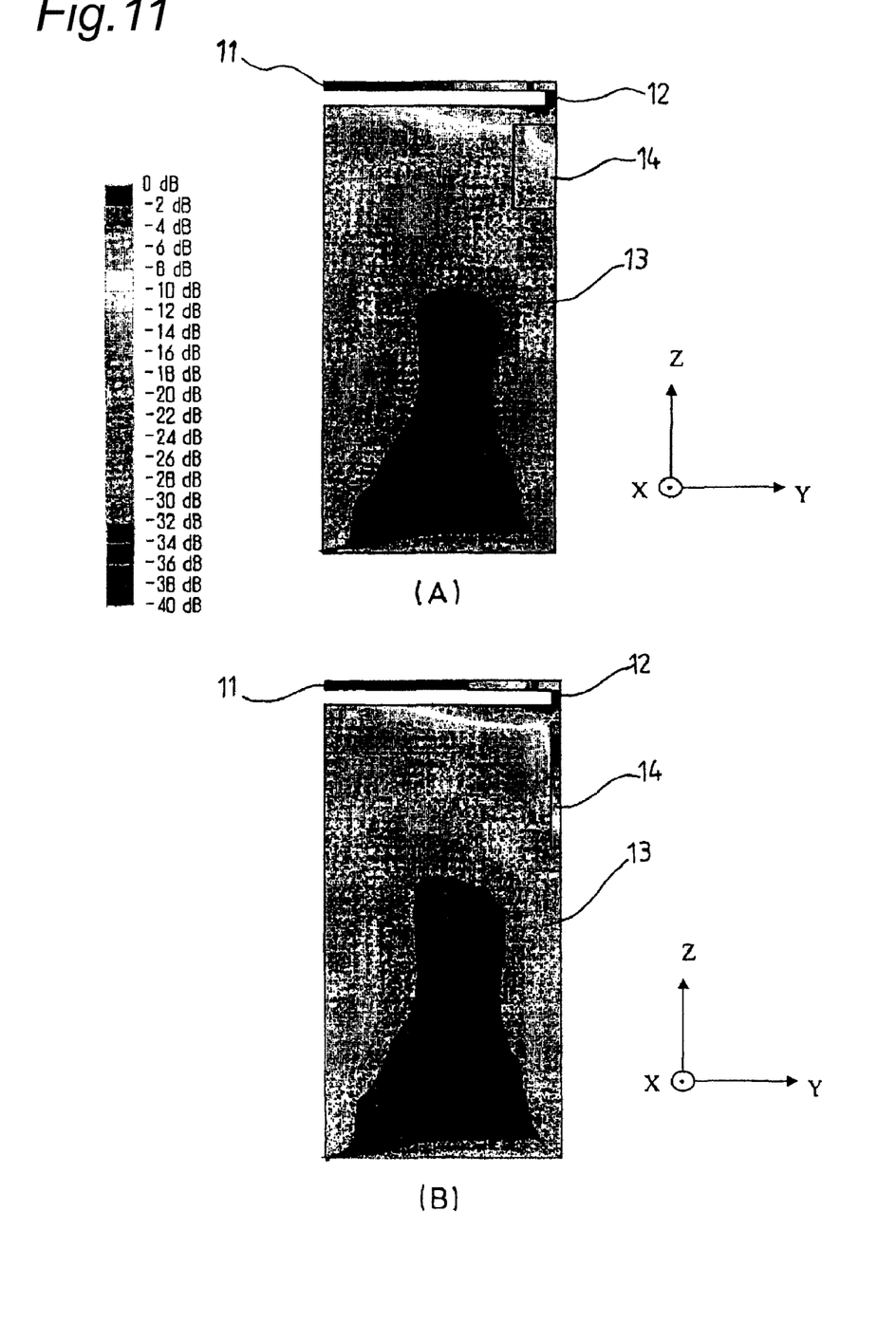
FIG. 11A is a current distribution diagram of the communication terminal apparatus of the invention shown in FIG. 2 and FIG. 9A.
FIG. 11B is a current distribution diagram of the case having a ground wire with an undesirable shape used as a comparative example.

Next, radiation patterns of the case of (ii) the two-element monopole antennas are shown in FIGS. 8A and 8B.

FIG. 8A is a radiation pattern diagram of 1800 MHz at the time of forming the two-element monopole antenna 11 as shown in FIG. 7A in the back surface direction of the housing 10, and shows a principal polarization component α and a cross polarization component β of an X-Y plane. On the other hand, FIG. 8B shows a comparative example and is a radiation pattern diagram of 1800 MHz at the time of forming the two-element monopole antenna 11 as shown in FIG. 7B so as to extend in the just above direction from the upper surface 10A of the housing 10 in the upper surface 10A (see FIG. 1) of the housing 10, and shows a principal polarization component α and a cross polarization component β of an X-Y plane.

In the case of comparing the principal polarization components α of FIGS. 8A and 8B, while the principal polarization component α of FIG. 8A is about −6 dB, an F/B ratio (Front to back ratio) of the principal polarization component α of FIG. 8B is about 0 dB. This indicates that the antenna element 11A resonating at a band of 900 MHz operates as a reflector of the antenna element 11B resonating at a band of 1800 MHz and thereby emission of electromagnetic waves in the back surface direction of the housing 10 becomes predominant and the electromagnetic waves are predominantly emitted in the back surface direction of the housing opposite to the human body (user) at the time of a call.

Thus, as shown in FIG. 7A, the monopole antenna (two-element monopole antenna in the embodiment) 11 having plural elements is formed in the back surface direction of the housing 10 and an antenna element resonating at a first frequency (for example, 900 MHz) of the monopole antenna 11 having the plural elements described above is formed in the side of the human body (user) and an antenna element resonating at a second frequency (for example, 1800 MHz) and a third frequency (for example, 2000 MHz) or higher is arranged in a position farther from the human body (user) than the antenna element resonating at the first frequency described above and thereby, emission in the back surface direction of the housing 10 opposite to the human body (user) becomes predominant. As a result of that, by decreasing electromagnetic waves absorbed in the head of the human body (user) at the time of a call, gain at the time of the call can be improved and a parasitic element is not required in order to perform directivity control, so that space of the inside of the housing 10 can be used effectively and cost can also be reduced.

Also, in like manner, as shown in FIG. 7A, the two-element monopole antenna 11 is formed in the back surface direction of the housing 10 and the open end of the two-element monopole antenna 11 is formed in a position far from the human body (user) in the side opposite to the human body (user) and thereby, particularly at a band of 1800 MHz at which emission from the antenna element becomes predominant, the peak point of a current is moved away from the head of the human body (user) and an SAR (Specific Absorption Ratio) can be reduced by about 15%.

Next, an effect of the ground wire 14 disposed in the communication terminal apparatus 1 of the embodiment will be described with reference to FIGS. 9A to 11B.

A ground wire 14 shown in FIG. 9A is grounded on a wireless ground near to a power feeding part 12 on a substrate 13 and thereby, a band at a high frequency band is widened as compared with the case where there is no ground wire 14 (FIG. 9B) and an antenna 11 forms a multi-frequency sharing antenna capable of coping from an EGSM band (880 MHz to 960 MHz) to a UMTS band (1920 MHz to 2170 MHz). A graph showing a VSWR (Voltage Standing Wave Ratio) at this time is shown in FIGS. 10A and 10B.

FIG. 10A is a VSWR diagram of the case (shown in FIG. 9A) of adding the ground wire 14, and FIG. 10B is a VSWR diagram of the case (shown in FIG. 9B) where there is no ground wire.

When the ground wire 14 described above is added in order to widen a band of the antenna, the peak of a current concentrates in the ground wire 14 as shown in FIG. 11B depending on a shape of the ground wire 14. As a result of this, an SAR may deteriorate.

Therefore, the invention is constructed so that this ground wire 14 is formed in a plate shape and also a circumferential length is set at about (½)λ of a working frequency and a length of a width direction of the substrate 13 is set at about (⅛)λ or less. By this (for example, the shape shown in FIG. 2), the peak of a current flowing through the ground wire 14 is distributed and the current is passed in a longitudinal direction (downward direction) of a housing 10 of the power feeding point side 12 and thereby, the SAR can be reduced further (FIG. 11A).

Also, by this configuration, in a communication terminal apparatus such as a mobile telephone in which miniaturization and thinning are mainstream in recent years, a longitudinal occupation width in the housing can be decreased in the ground wire 14 and it is effective in the case of forming an IO connector, a storage memory, etc. on an inside surface of the housing.

According to the embodiment as described above, there can be provided a communication terminal apparatus characterized in that antenna gain at the time of a call can be improved and simultaneously an SAR can be reduced and call quality of the communication terminal apparatus can be improved and also an influence on the human body by electromagnetic waves can be reduced and thinning can be achieved in a small size.

In addition, the invention is not limited to the embodiment described above, and can be implemented in various forms without departing from the gist.

The invention has been described in detail with reference to the specific embodiment, but it is apparent to those skilled in the art that various changes or modifications can be made without departing from the spirit and scope of the invention.

The present application is based on Japanese patent application (patent application No. 2006-034059) filed on Feb. 10, 2006, and the contents of the patent application are hereby incorporated by reference.

INDUSTRIAL APPLICABILITY

A communication terminal apparatus of the invention has effects capable of improving antenna gain at the time of a call and reducing an SAR having a medical influence on a user (human body) and achieving miniaturization and thinning of a housing, and is useful in an improvement in call quality of the communication terminal apparatus in actual use, a reduction in an adverse influence on the human body by electromagnetic waves, etc.

The invention claimed is:

1. A communication terminal apparatus comprising:
a substrate disposed inside a housing, the substrate including a substrate surface occupying the most surface area of any surface of the substrate;
a power feeding part disposed in the substrate; and
a monopole antenna having a first element configured to resonate at first frequency, a second element configured to resonate at second frequency and one end connected to the power feeding part for feeding power to the first element and the second element, wherein
the first element and the second element are substantially perpendicular to the substrate surface, wherein
the communication terminal apparatus has a front surface that faces a user when the terminal is placed adjacent the user's head during use and a back surface that faces away from the user when the terminal is placed adjacent the user's head during use,
the first frequency is lower than the second frequency, and
at least a part of the first element is closer to the front surface than the second element is to the front surface.

2. The communication terminal apparatus according to claim 1, wherein
the substrate includes a right edge and an opposing left edge each having a top end and a bottom end, a top edge extending between the top end of the right edge and the top end of the left edge, a bottom edge extending between the bottom end of the right edge and the bottom end of the left edge, and
the substrate surface is defined between the right edge, left edge, top end and bottom end.

3. A communication terminal apparatus comprising:
a substrate disposed inside a housing, the substrate including a substrate surface occupying the most surface area of any surface of the substrate;
a power feeding part disposed in the substrate; and
a monopole antenna having a first element configured to resonate at first frequency, a second element configured to resonate at second frequency and one end connected to the power feeding part for feeding power to the first element and the second element, wherein
the first element and the second element are substantially perpendicular to the substrate surface;
an open end between the first element and the second element, wherein
the communication terminal apparatus has a front surface that faces a user when the terminal is placed adjacent the user's head during use and a back surface that faces away from the user when the terminal is placed adjacent the user's head during use, and
the open end being closer to the back surface than the open end is to the front surface.

4. The communication terminal apparatus according to claim 3, wherein
the substrate includes a right edge and an opposing left edge each having a top end and a bottom end, a top edge extending between the top end of the right edge and the top end of the left edge, a bottom edge extending between the bottom end of the right edge and the bottom end of the left edge, and
the substrate surface is defined between the right edge, left edge, top end and bottom end.

5. A communication terminal apparatus comprising:

a substrate disposed inside a housing, the substrate including a substrate surface occupying the most surface area of any surface of the substrate;

a power feeding part disposed in the substrate;

a monopole antenna having a first element configured to resonate at first frequency, a second element configured to resonate at second frequency and one end connected to the power feeding part for feeding power to the first element and the second element; and a ground wire electrically connected to a wireless ground on the substrate surface, wherein the first element and the second element are substantially perpendicular to the substrate surface.

6. The communication terminal apparatus according to claim 5, wherein the substrate includes a right edge and an opposing left edge each having a top end and a bottom end, a top edge extending between the top end of the right edge and the top end of the left edge, a bottom edge extending between the bottom end of the right edge and the bottom end of the left edge, and the substrate surface is defined between the right edge, left edge, top end and bottom end.

* * * * *